United States Patent Office 3,823,157
Patented July 9, 1974

3,823,157
PYRAZOLODIAZEPINE COMPOUNDS AND
METHODS FOR THEIR PRODUCTION
Horace A. De Wald, 2704 Colony Road, Ann Arbor, Mich. 48104, and Sandra J. Lobbestael, 777 Washtenaw Ave., Apt. 5, Ypsilanti, Mich. 48197
No Drawing. Filed Dec. 15, 1972, Ser. No. 315,631
Int. Cl. C07d 49/18
U.S. Cl. 260—310 R  9 Claims

ABSTRACT OF THE DISCLOSURE 1,6,7,8-Tetrahydropyrazolo[3,4-e][1,4]diazepine compounds, substituted in the 1- and 3-positions by methyl or ethyl, optionally in the 6-position by methyl, optionally in the 8-position by methyl or ethyl, and in the 4-position by m-substituted phenyl, in which the substituent is chloro, bromo, fluoro, methyl, nitro, hydroxy, trifluoromethyl, amino, cyano, or azido, by 3,4-dichlorophenyl, or by 3-chloro-o-tolyl; acid-addition salts thereof; and their production by (a) reacting a 4-(substituted benzoyl)-5-halopyrazole or a 4-(substituted benzimidoyl)-5-halopyrazole with an ethylenediamine, (b) brominating a 4-phenylpyrazolodiazepine, (c) nitrating a 4-phenylpyrazolodiazepine, (d) hydrogenating a 4-(m-nitrophenyl)pyrazolodiazepine, (e) reacting a diazonium salt derived from a 4-(m-aminophenyl)pyrazoldiazepine with an aqueous solution of an inorganic azide or cyanide salt, and (f) oxidizing a hexahydropyrazolodiazepine. The compounds are useful as intermediates and as antidepressant agents.

SUMMARY AND DETAILED DESCRIPTION

The present invention relates to new heterocyclic nitrogen compounds that are useful as pharmacological agents and to methods for their production. More particularly, the invention relates to new pyrazolodiazepine compounds having the formula

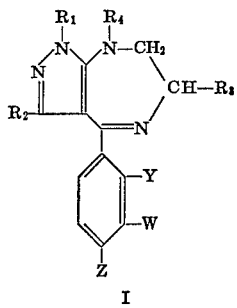

I and to pharmaceutically-acceptable salts thereof; where each of $R_1$ and $R_2$ is methyl or ethyl, $R_3$ is hydrogen or methyl, $R_4$ is hydrogen, methyl, or ethyl, W represents chloro, bromo, fluoro, methyl, nitro, hydroxy, trifluoromethyl, amino, cyano, or azido, and one of Y and Z represents hydrogen, chloro, or methyl and the other of Y and Z represents hydrogen.

In accordance with the invention, pyrazolodiazepine compounds having the formula

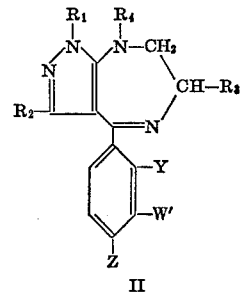

II and salts thereof are produced by reacting a pyrazole compound having the formula

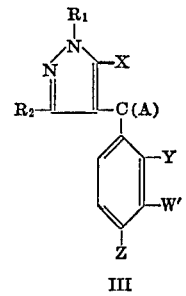

III with a diamine compound having the formula

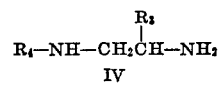

IV where each of $R_1$, $R_2$, $R_3$, $R_4$, Y and Z has the same meaning as given above; W' represents chloro, bromo, fluoro, methyl, hydroxy, and trifluoromethyl; A represents a doubly-bonded oxygen atom (=O) or an imido group (=NH); and X represents a halogen, preferably chloro. The reaction is best carried out in a solvent medium, which is preferably an excess of the diamine reactant. Other solvents that may be used include tertiary amides, such as 1-methyl-2-pyrrolidinone and N,N-dimethylacetamide; aromatic hydrocarbons, such as toluene and xylene; tertiary amines, such as pyridine, and glycols, such as ethylene glycol and propylene glycol. The temperature and duration of the reaction may be varied over a wide range, the temperature from about 80 to about 200° C., and the duration from two to 36 hours. The reaction is most conveniently carried out at the reflux temperature of the reaction mixture, and at such temperature is essentially complete after a period of from 16 to 24 hours. While equivalent quantities of the reactants may be employed, best results are obtained by using an excess of the diamine reactant. The pyrazolodiazepine product may be isolated directly in free base form or in the form of an acid-addition salt, by appropriate adjustment of the pH as desired.

The pyrazole compounds having formula III above that are used as starting materials in the foregoing process are prepared in a variety of ways, as described in detail hereinafter. According to one general method, 4-aroyl-5-chloro-pyrazole compounds having the formula

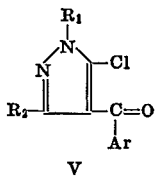

V are prepared by reacting a 5-chloropyrazole compound having the formula

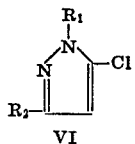

VI with an aroyl chloride having the formula

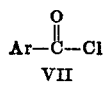

VII in the presence of anhydrous aluminum chloride; where each of $R_1$ and $R_2$ has the aforementioned significance and Ar represents m-chlorophenyl, m-fluorophenyl, m-bromophenyl, m-tolyl, or 3,4-dichlorophenyl.

Also in accordance with the present invention, pyrazolodiazepine compounds falling within the scope of formula I above are produced by a variety of additional methods. 4 - (m - Bromophenyl)pyrazolodiazepines, that is, compounds having formula I wherein each of Y and Z is hydrogen and W is bromo, are produced by reacting a 4-(unsubstituted phenyl)pyrazolodiazepine compound with bromine in the presence of silver sulfate in sulfuric acid solution at a temperature in the range of from 20 to 40° C. for a period of from 10 to 24 hours. 4-(m-Nitrophenyl)pyrazolodiazepines, that is, the compounds of formula I wherein each of Y and Z is hydrogen and W is nitro, are produced by nitrating a 4-(unsubstituted phenyl) pyrazolodiazepine compound, which is preferably accomplished by reaction with potassium nitrate and sulfuric acid at a temperature between 0 and 50° C. for a period of from one to 24 hours. 4-(m-Aminophenyl)pyrazolodiazepines, that is, the compounds of formula I wherein each of Y and Z is hydrogen and W is amino, are produced by hydrogenating a corresponding 4-(m-nitrophenyl)pyrazolodiazepine, employing gaseous hydrogen and a hydrogenation catalyst, such as Raney nickel, in a lower alkanol solvent at room temperature. 4-(m-Azidophenyl)- and 4-(m-cyanophenyl)pyrazolodiazepines, that is, the compounds of formula I wherein each of Y and Z is hydrogen and W is azido or cyano, respectively, are in turn produced by first diazotizing one of the 4-(m-aminophenyl)pyrazolodiazepines and then reacting the diazonium salt intermediate with an aqueous solution of an inorganic azide or cyanide salt, respectively. Finally, pyrazolodiazepine compounds of the invention having formula II above are also produced by oxidizing a corresponding hexahydropyrazolodiazepine compound, that is, a compound having the formula

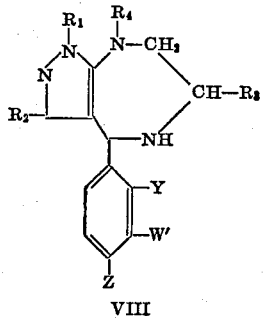

VIII employing an oxidizing agent selected from among manganese dioxide, an alkali metal permanganate, and a di(lower alkyl)azodicarboxylate, in an unreactive, nonpolar solvent, such as benzene at a temperature between 50 and 150° C. for a period of from 12 to 24 hours; where each of $R_1$, $R_2$, $R_3$, $R_4$, W', Y, and Z is defined as before. The various pyrazolodiazepine products of the reactions described above may be isolated directly in free base form or in the form of an acid-addition salt, by appropriate adjustment of the pH as desired. The various starting materials and intermediates required to carry out the reactions described in the foregoing are prepared as described in detail hereinafter.

The compounds of the invention can exist in the free base form having formula I above or in the form of an acid-addition salt. Pharmaceutically-acceptable salts are formed as already indicated above or by reaction of the free base with any of a number of inorganic and organic acids, including hydrochloric, hydrobromic, hydriodic, sulfuric, nitric, phosphoric, acetic, benzoic, citric, maleic, malic, tartaric, succinic, gluconic, ascorbic, sulfamic, oxalic, pamoic, methanesulfonic, benzenesulfonic, and related acids. The free base pyrazolodiazepine compounds and their salts may differ somewhat in certain physical properties, such as solubility in polar solvents, but they are otherwise equivalent for purposes of the invention.

The compounds of the invention can exist in anhydrous form, as well as in solvated, including hydrated, forms. In general, the hydrated forms and the solvated forms with pharmaceutically-acceptable solvents are equivalent to the anhydrous or unsolvated forms for the purposes of the invention.

The compounds of the invention are new chemical compounds that are useful as chemical intermediates and as pharmacological agents. The use of certain of the present compounds as intermediates for the preparation of other compounds of the invention has already been described in the foregoing. As pharmacological agents, the compounds of the invention exhibit antidepressant activity that can be demonstrated and quantitatively determined in a pharmacological assay that measures the ability of a test compound to potentiate the known psychic energizing effect of methamphetamine. This assay is carried out as follows.

Male albino rats are deprived of food and water for twenty hours prior to test. At test time they are dosed intraperitoneally with the test compound, with separate groups of eight rats each receiving a dose of 10, 5, or 2.5 mg./kg. (base). Immediately following dosing the rats are placed in individual metabolism cages without food or water for a waiting period; for half the rats at each dose level the waiting period is 15 minutes, and for the other half it is two hours. After the waiting period, all the rats are given an intraperitoneal injection of 0.75 mg./kg. of methamphetamine (base), and then, twenty minutes later, are allowed access to a milk preparation in a graduated and calibrated tube. The preparation consists of one part sweetened condensed milk and two parts water. Total milk ingestion of each animal after 30 minutes, one hour, 90 minutes, and two hours is recorded and compared with that of control animals that are dosed only with methamphetamine. The total ingested after two hours is considered the critical amount, and is the one used to assess activity.

A test compound is considered to be an active antidepressant agent in this test if it shows significant methamphetamine potentiation, that is, enhanced inhibition of milk ingestion, at a dose of 10 mg./kg. (base) or less in either of the two groups of rats tested at each dosage level. Highly active antidepressant agents can be further differentiated if they show an increased enhancement of inhibition of milk ingestion in the group of test animals that are subjected to the two-hour waiting period between injections of the test compound and methamphetamine. Thus, since in this test rats dosed only with methamphetamine normally consume an average of 4.2 ml. of milk (per 100 g. of body weight), a test compound is considered to be active if at a dose of 10 mg./kg. (base) or less it leads to ingestion of 3.5 ml. or less in those rats dosed with methamphetamine 15 minutes after injection of the compound; and it is regarded as more highly active if at the same dosage it leads to an even lower ingestion of milk in those animals dosed with methamphetamine after a waiting period of two hours. By utilizing the foregoing test procedure it has been possible to demonstrate activity for the known clinically useful antidepressant agents, amitriptyline and imipramine, thereby confirming the validity of this assay for determining antidepressant activity.

The results obtained in this assay for some representative compounds of the present invention are shown in the following table, where the compounds are identified by reference to the examples that follow. In this table, the amounts of milk ingestion, in ml. per 100 g. of body weight, are given for both groups of rats at the indicated dose level, that is, for the group of rats dosed with methamphetamine 15 minutes after injection of the test compound and for the group dosed with methamphetamine after a two-hour waiting period. It is seen from the table that a number of the present compounds were administered at dosages significantly lower than 2.5 mg./kg. (base) and exhibited activity at those lower dosage levels.

ANTIDEPRESSANT ACTIVITY

| Compound | Dose, mg./kg. (base) | Milk ingestion, ml./100 g., after waiting period of— | |
|---|---|---|---|
| | | 15 min. | 2 hours |
| Example: | | | |
| 1 | 10 | 0.0 | 0.1 |
| | 5 | 0.1 | 0.1 |
| | 2.5 | 0.0 | 0.2 |
| | 1.25 | 1.35 | 0.4 |
| | 0.63 | 1.35 | 1.35 |
| | 0.32 | 3.5 | 4.1 |
| 2(b) | 10 | 0.2 | 0.0 |
| | 5 | 0.2 | 0.0 |
| | 2.5 | 1.8 | 0.0 |
| | 1.25 | 2.8 | 3.2 |
| | 0.63 | 2.8 | 3.1 |
| | 0.32 | 3.7 | 4.4 |
| 3 | 10 | 0.5 | 0.0 |
| | 5 | 0.1 | 0.0 |
| | 2.5 | 0.3 | 0.2 |
| | 1.25 | 0.7 | 0.8 |
| | 0.63 | 3.0 | 1.6 |
| | 0.32 | 3.6 | 2.7 |
| 5(b) | 10 | 0.4 | 0.1 |
| | 5 | 1.3 | 1.3 |
| | 2.5 | 0.5 | 0.4 |
| 7 | 5 | 0.1 | 0.0 |
| | 2.5 | 0.1 | 0.0 |
| | 1.25 | 0.8 | 0.6 |
| | 0.63 | 2.0 | 1.4 |
| | 0.32 | 2.2 | 2.9 |
| | 0.16 | 2.2 | 4.3 |
| 9 | 10 | 0.5 | 0.0 |
| | 5 | 0.4 | 0.4 |
| | 2.5 | 0.2 | 0.1 |
| | 1.25 | 0.7 | 0.3 |
| | 0.63 | 1.4 | 1.2 |
| | 0.32 | 4.3 | 3.0 |
| 10 | 10 | 0.8 | 0.2 |
| | 5 | 0.3 | 0.5 |
| | 2.5 | 0.5 | 0.6 |
| 11 | 10 | 0.3 | 0.5 |
| | 5 | 0.5 | 0.0 |
| | 2.5 | 1.8 | 1.2 |
| | 1.25 | 1.7 | 3.2 |
| | 0.63 | 4.2 | 4.3 |
| | 0.32 | 4.2 | 3.9 |
| 12 | 10 | 0.2 | 0.2 |
| | 5 | 0.3 | 0.2 |
| | 2.5 | 2.9 | 0.3 |
| | 1.25 | 2.9 | 2.6 |
| | 0.63 | 3.4 | 4.9 |
| | 0.32 | 4.1 | 4.5 |
| 14 | 10 | 0.8 | 0.0 |
| | 5 | 2.5 | 1.3 |
| | 2.5 | 2.6 | 2.7 |

ANTIDEPRESSANT ACTIVITY—Continued

| Compound | Dose, mg./kg. (base) | Milk ingestion, ml./100 g., after waiting period of— | |
|---|---|---|---|
| | | 15 min. | 2 hours |
| 16 | 10 | 0.4 | 0.2 |
| | 5 | 0.6 | 0.0 |
| | 2.5 | 0.1 | 0.7 |
| | 1.25 | 0.5 | 0.0 |
| | 0.63 | 0.6 | 0.4 |
| | 0.32 | 0.7 | 1.4 |
| 17 | 10 | 1.2 | 0.8 |
| | 5 | 0.1 | 1.7 |
| | 2.5 | 1.3 | 0.8 |
| 18 | 5 | 0.5 | 0.4 |
| | 2.5 | 0.1 | 0.4 |
| | 1.25 | 0.8 | 2.2 |
| 19 | 5 | 1.6 | 1.0 |
| | 2.5 | 1.6 | 1.0 |
| | 1.25 | 3.4 | 2.6 |
| Imipramine | 10 | 0.0 | 0.0 |
| | 5 | 0.5 | 0.1 |
| | 2.5 | 3.3 | 2.2 |

The compounds of the invention can be administered either orally or parenterally. They can be combined with a solid or liquid carrier or diluent and made available in varying amounts in such pharmaceutical forms as tablets, capsules, powders, and aqueous and non-aqueous suspensions and solutions.

The invention is illustrated by the following examples.

Example 1

A mixture consisting of 54 g. of 5-chloro-4-(m-chlorobenzoyl)-1,3-dimethylpyrazole, 20 g. of ethylenediamine, and 80 ml. of 1-methyl-2-pyrrolidinone is stirred and heated under reflux for 18 hours and then evaporated under reduced pressure. The residue is dissolved in 350 ml. of $N$ hydrochloric acid, and the resulting solution is cooled to 0–5° C. The precipitated solid is isolated by filtration and mixed well with dilute aqueous sodium hydroxide. The basic mixture is extracted with dichloromethane, and the extract is dried and evaporated to give 4 - (m - chlorophenyl) - 1,6,7,8-tetrahydro-1,3-dimethylpyrazolo[3,4-e][1,4]diazepine; m.p. 182–184° C., following crystallization from ethyl acetate-petroleum ether.

A small sample of the free base product obtained as described above is dissolved in acetone, and to the solution is added a slight excess of a 20% solution of hydrogen chloride in 2-propanol. The solid that precipitates is isolated by filtration and dried. It is the monohydrochloride salt of 4-(m-chlorophenyl)-1,6,7,8-tetrahydro-1,3-dimethylpyrazolo[3,4-e][1,4]-diazepine; m.p. 275° C. (with decomposition), following crystallization from 2-propanol.

Example 2

Utilizing the procedure described in Example 1 above, the following 4-arylpyrazolo[3,4-e][1,4]diazepine compounds are obtained from the reactions indicated below.

(a) From the reaction of 57 g. of 5-chloro-4-(m-chlorobenzoyl)-1-ethyl-3-methylpyrazole with 20 g. of ethylenediamine in 80 ml. of 1-methyl-2-pyrrolidinone, there is obtained 4-(m - chlorophenyl)-1,6,7,8-tetrahydro-1-ethyl-3-methylpyrazolo[3,4-e[1,4]diazepine.

(b) From the reaction of 13 g. of 5-chloro-1,3-dimethyl-4-m-toluylpyrazole with 6 g. of ethylenediamine in 50 ml. of 1-methyl-2-pyrrolidinone, there is obtained 1,6,7,8-tetrahydro - 1,3-dimethyl-4-m-tolylpyrazolo[3,4-e][1,4]diazepine. The monohydrochloride salt, also obtained by the procedure described in Example 1 above, has m.p. 244–246° C., following crystallization from 2-propanol.

Example 3

A mixture consisting of 16 g. of 4-(*m*-bromobenzoyl)-5-chloro-1,3-dimethylpyrazole and 30 ml. of ethylenediamine is stirred and heated under reflux for 20 hours, cooled, and diluted with water. The aqueous mixture is extracted with dichloromethane, and the extract is washed with water, dried, and evaporated under reduced pressure to give a residue of 4-(*m*-bromophenyl-1,6,7,8-tetrahydro-1,3 - dimethylpyrazolo[3,4-e][1,4]diazepine; m.p. 153–155° C., following crystallization from acetone.

Example 4

A mixture consisting of 14 g. of 4-(*m*-bromobenzoyl)-5-chloro-3-ethyl-1-methylpyrazolo and 30 ml. of ethylenediamine is stirred and heated under reflux for 16 hours and then evaporated under reduced pressure. The residue is partitioned between 1 N hydrochloric acid and benzene, and the acidic phase is separated and made basic with concentrated aqueous sodium hydroxide. The basic mixture is extracted with dichloromethane, and the extract is washed with water, dried, and evaporated under reduced pressure to give a residue of 4-(*m*-bromophenyl)-3-ethyl-1,6,7,8-tetrahydro - 1 - methylpyrazolo[3,4-e][1,4]diazepine. This free base product is dissolved in 25 ml. of 2-propanol, and to the solution is added a slight excess of a 20% solution of hydrogen chloride in 2-propanol. The resulting mixture is then diluted with sufficient acetone to effect the precipitation of 4 - (*m*-bromophenyl)-3-ethyl-1,6,7,8-tetrahydro - 1 - methylpyrazolo[3,4-e][1,4]diazepine, monohydrochloride, which is isolated by filtration, washed with acetone, and dried; m.p. 289–291° C. (with decomposition).

Example 5

(a) A mixture consisting of 30 g. of 5 - chloro - 4 - (*m*-fluorobenzoyl) - 1,3 - dimethylpyrazole, 11 g. of ethylenediamine, and 25 ml. of xylene (mixture of isomers, b.p. 139–140° C.) is stirred and heated under reflux for 4 hours and then cooled to room temperature. The reaction mixture is diluted with 100 ml. of benzene, and the resulting solution is mixed well with 150 ml. of 1 N aqueous sodium hydroxide. The organic phase is separated, washed with water, dried, and evaporated. The residue obtained is stirred with 200 ml. of 1 N hydrochloric acid, and the acidic mixture is filtered. The filtrate is made basic with concentrated aqueous sodium hydroxide, and the basic mixture is extracted with dichloromethane. The extract is washed with water, dried, and evaporated under reduced pressure to give 4-(*m*-fluorophenyl)-1,6,7,8-tetrahydro-1,3-dimethylpyrazolo[3,4 - e][1,4]diazepine, monohydrate; m.p. 114–116° C., following crystallization from aqueous ethanol.

(b) Utilizing the procedure described in (a) above, from the reaction of 30 g. of 5 - chloro - 3 - ethyl-4-(*m*-fluorobenzoyl) - 1 - methylpyrazole with 6 ml. of ethylenediamine in 10 ml. of xylene, there is obtained 3 - ethyl-4-(*m* - fluorophenyl) - 1,6,7,8 - tetrahydro - 1 - methylpyrazolo[3,4-e][1,4]diazepine; m.p. 143–145° C., following crystallization from benzene-petroleum ether.

Example 6

A mixture consisting of 20 g. of 5 - chloro - 3 - ethyl-1 - methyl - 4 - *m* - toluylpyrazole, 15 ml. of ethylenediamine, and 100 ml. of pyridine is stirred and heated under reflux for 18 hours and then evaporated under reduced pressure. The residue is stirred with 200 ml. of 2 N hydrochloric acid, and the acidic mixture is extracted with ether, which extract is discarded. The acidic mixture is next made basic with concentrated aqueous sodium hydroxide, and the basic mixture is extracted with dichloromethane. The extract is washed with water, dried, and evaporated to give an oily residue of 3 - ethyl - 1,6,7,8-tetrahydro - 1 - methyl - 4 - *m* - tolylpyrazolo[3,4-e][1,4]diazepine. A solution of this free base product (15 g.) in 25 ml. of acetonitrile is mixed with a solution of 5.5 g. of maleic acid in 40 ml. of acetonitrile, and the resulting solution is diluted with ether and cooled to 0–5° C. to give a solid precipitate of 3 - ethyl - 1,6,7,8, - tetrahydro-1-methyl - 4 - *m*-tolylpyrazolo[3,4-e][1,4]diazepine, monomaleate, which is isolated by filtration, washed with ether, and dried; m.p. 177–178° C.

Example 7

A mixture consisting of 15 g. of 5 - chloro - 1,3 - dimethyl - 4 - (*m*-trifluoromethylbenzoyl)pyrazole and 20 ml. of ethylenediamine is stirred and heated under reflux for 20 hours and then evaporated under reduced pressure. The residue is treated with excess 5 N hydrochloric acid, and the acidic mixture is treated with activated charcoal and filtered. The filtrate is made basic with concentrated aqueous sodium hydroxide, and the basic mixture is extracted with ether. The ether extract is concentrated to a small volume, and the concentrated solution is treated with sufficient petroleum ether to give a solid precipitate of 1,6,7,8 - tetrahydro - 1,3 - dimethyl-4-($\alpha,\alpha,\alpha$ - trifluoro-*m* - tolyl)pyrazolo[3,4 - e][1,4]diazepine, hemihydrate, which is isolated and dried; m.p. 95–98° C.

Example 8

A mixture consisting of 7 g. of 5 - chloro - 4 - (*m*-chlorobenzoyl) - 1,3 - dimethylpyrazole and 15 ml. of N-methylethylenediamine is stirred and heated under reflux for 16 hours, cooled, and partitioned between 3 N hydrochloric acid and benzene. The acidic phase is separated and made basic with concentrated aqueous sodium hydroxide. The basic mixture is extracted with dichloromethane, and the extract is washed with water, dried, and evaporated to give an oily residue of 4 - (*m*-chlorophenyl) - 1,6,7,8 - tetrahydro - 1,3,8 - trimethylpyrazolo[3,4-e][1,4]diazepine. This free base product is dissolved in a slight excess over two equivalents of a 20% solution of hydrogen chloride in 2-propanol, and the solution is diluted with sufficient tetrahydrofuran to effect the precipitation of 4-(*m*-chlorophenyl)-1,6,7,8-tetrahydro-1,3,8-trimethylpyrazolo[3,4-e][1,4]diazepine, dihydrochloride, which is isolated by filtration, washed with ether, and dried; m.p. 170° C. (with decomposition).

Example 9

A mixture consisting of 13.5 g. of 5 - chloro - 4 - (*m*-chlorobenzoyl) - 1,3 - dimethylpyrazole and 15 ml. of 1,2-diaminopropane is stirred and heated under reflux for 24 hours, cooled, and diluted with water. The aqueous mixture is extracted with dichloromethane, and the extract is washed with water, dried and evaporated under reduced pressure. The oily residue is dissolved in acetone, and the resulting solution is passed through a column of activated magnesium silicate (for example, Florisil). The column is eluted with acetone, and the combined eluates are evaporated under reduced pressure to give 4-(*m*-chlorophenyl) - 1,6,7,8 - tetrahydro - 1,3,6 - trimethylpyrazolo[3,4-e][1,4]diazepine; m.p. 96–98° C., following crystallization from ether-petroleum ether.

Example 10

A mixture consisting of 10 g. of 5 - chloro - 4 - (*m*-hydroxybenzoyl) - 1,3 - dimethylpyrazole, 5.5 ml. of N-methylethylenediamine, and 7 ml. of xylene (mixture of isomers, b.p. 139–140° C.) is heated under reflux for 5 hours, cooled, and diluted with dichloromethane. The resulting solution is washed with aqueous sodium bicarbonate and with water and is then dried and evaporated under reduced pressure. The residue is dissolved in 15 ml. of 2-propanol, and to the solution is added 8 ml. of a 20% solution of hydrogen chloride in 2-propanol. The solution obtained is then diluted to cloudiness with ethyl acetate and cooled to 0–5° C. to give a solid precipitate, which is isolated, washed with ethyl acetate, and dried. It is *m*-(1,6,7,8-tetrahydro - 1,3,8, - trimethylprazolo[3,4-e][1,4]diazepin - 4 - yl)phenol dihydrochloride combined with one

Example 11

A mixture consisting of 10 g. of 5-chloro-4-(3,4-dichlorobenzoyl)-1,3-dimethylpyrazole and 30 ml. of ethylenediamine is stirred and heated under reflux for 18 hours and then evaporated under reduced pressure. The residue is partitioned between dilute hydrochloric acid and benzene, and the acidic phase is separated and made basic with concentrated aqueous sodium hydroxide. The basic mixture is extracted with dichloromethane, and the extract is washed with water, dried, and evaporated to give an oily residue of 4-(3,4-dichlorophenyl)-1,6,7,8-tetrahydro-1,3-dimethylpyrazolo[3,4-e][1,4]diazepine. This free base product is dissolved in 30 ml. of acetone, and to the solution is added a slight excess of a 20% solution of hydrogen chloride in 2-propanol. The resulting solid precipitate is isolated, washed with acetone, and dried; it is 4-(3,4-dichlorophenyl) - 1,6,7,8, - tetrahydro-1,3-dimethylpyrazolo[3,4-e] [1,4]diazepine, monohydrochloride, m.p. 150° C. (with decomposition).

Example 12

A mixture consisting of 16 g. of 5-chloro-4-(3-chloro-2-methylbenzimidoyl)-1,3-dimethylpyrazole and 25 ml. of ethylenediamine is stirred and heated under reflux for 18 hours, cooled, and diluted with 200 ml. of ether. The precipitated solid is isolated by filtration and dissolved in dilute hydrochloric acid. The acidic solution is made basic with concentrated aqueous sodium hydroxide, and the resulting basic mixture is extracted with dichloromethane. The extract is washed with water, dried, and evaporated to give 4-(3-chloro-o-tolyl)-1,6,7,8-tetrahydro-1,3-dimethylpyrazolo[3,4 - e][1,4]diazepine; m.p. 204–206° C., following crystallization from acetone.

Example 13

To a stirred solution of 6 g. of 1,6,7,8-tetrahydro-1,3-dimethyl - 4 - phenylpyrazolo[3,4-e][1,4]diazepine in a mixture of 30 ml. of concentrated sulfuric acid and 3 ml. of water at room temperature is added first 4.8 g. of silver sulfate, then dropwise 4 g. of bromine. The reaction mixture is stirred at room temperature for 16 hours and then filtered. The filtrate is poured into 300 ml. of ice-water, and the aqueous mixture is made basic with concentrated aqueous ammonia. The basic mixture is extracted with ethyl acetate, and the extract is washed with water, dried, and evaporated to give 4-(m-bromophenyl)-1,6,7,8-tetrahydro-1,3-dimethylpyrazolo[3,4 - e][1,4]diazepine; m.p. 153–155° C., following crystallization from acetone.

Example 14

To a stirred solution of 12 g. of 1,6,7,8-tetrahydro-1,3-dimethyl - 4 - phenylpyrazolo[3,4-e][1,4]diazepine in 75 ml. of concentrated sulfuric acid maintained at 10° C. is added a solution of 6 g. of potassium nitrate in 20 ml. of concentrated sulfuric acid, and the reaction mixture is stirred at room temperature for 3 hours. It is then poured into 750 ml. of ice-water, and the resulting aqueous mixture is made basic with concentrated aqueous ammonia. The basic mixture is extracted with dichloromethane, and the extract is washed with water, dried, and evaporated to give a residue of 1,6,7,8-tetrahydro-1,3-dimethyl - 4 - (m-nitrophenyl)pyrazolo[3,4-e][1,4]diazepine. This free base product is dissolved in 2-propanol, and to the solution is added a slight excess of a 20% solution of hydrogen chloride in 2-propanol. Upon cooling to 0–5° C., there is obtained a solid precipitate of 1,6,7,8-tetrahydro - 1,3 - dimethyl-4-(m-nitrophenyl(pyrazolo[3,4-e][1,4]diazepine, monohydrochloride, which is isolated and dried; m.p. 292–295° C.

Example 15

A mixture consisting of 3.5 g. of 4-(m-chlorophenyl)-1,4,5,6,7,8-hexahydro - 1,3 - dimethylpyrazolo[3,4-e][1,4]diazepine, 3.5 g. of diethyl azodicarboxylate, and 35 ml. of benzene is stirred and heated under reflux for 16 hours and then cooled to room temperature. The mixture is next extracted with 1 N hydrochloric acid, and the acidic extract is made basic with concentrated aqueous sodium hydroxide. The basic mixture is in turn extracted with dichloromethane, and the dichloromethane extract is washed with water, dried, and evaporated to give 4-(m-chlorophenyl)-1,6,7,8-tetrahydro - 1,3 - dimethylpyrazolo-[3,4-e][1,4]diazepine; m.p. 181–183° C., following crystallization from acetone.

Example 16

A mixture consisting of 5 g. of 4-(m-chlorophenyl)-8-ethyl - 1,4,5,6,7,8 - hexahydro - 1,3 - dimethylpyrazolo-[3,4-e][1,4]diazepine, 5 g. of diethyl azodicarboxylate, and 30 ml. of benzene is stirred and heated under reflux for 18 hours, cooled, and filtered. The filtrate is extracted with 150 ml. of 1 N hydrochloric acid, and the acidic extract is made basic with concentrated aqueous sodium hydroxide. The basic mixture is in turn extracted with benzene, and the benzene extract is washed with water, dried, and evaporated. The oily residue is dissolved in ether, and the ethereal solution is passed through a column of activated magnesium silicate (Florisil). The column is eluted with ether, and the combined eluates are evaporated to give an oily residue of 4-(m-chlorophenyl)-8-ethyl - 1,6,7,8 - tetrahydro - 1,3 - dimethylpyrazolo[3,4-e][1,4]diazepine. This free base product is dissolved in acetone, to the solution is added a slight excess over two equivalents of a 20% solution of hydrogen chloride in 2-propanol, and, upon cooling, there is obtained a solid precipitate of 4-(m-chlorophenyl)-8-ethyl-1,6,7,8-tetrahydro - 1,3 - dimethylpyrazolo[3,4-e][1,4]diazepine, dihydrochloride, which is isolated by filtration, washed with acetone, and dried; m.p. 173–175° C. (with decomposition).

Example 17

1,6,7,8-Tetrahydro - 1,3 - dimethyl-4-(m-nitrophenyl)-pyrazolo[3,4-e][1,4]diazepine, monohydrochloride (5.5 g.; prepared as described in Example 14 above) is dissolved in water, and the aqueous solution is made basic with excess ammonium hydroxide. The basic solution is extracted with dichloromethane, and the extract is dried and evaporated to give 4.7 g. of 1,6,7,8-tetrahydro-1,3-dimethyl - 4 - (m-nitrophenyl)pyrazolo[3,4-e][1,4]diazepine. This free base is dissolved in 100 ml. of methanol, and to the solution is added 0.5 g. of Raney nickel. The mixture is then shaken with hydrogen at an initial pressure of 50 lbs./in.$^2$ at room temperature for 3 hours or until the calculated amount of hydrogen is absorbed. The hydrogenated mixture is filtered to remove the spent catalyst, and the filtrate is evaporated to dryness. The residue is dissolved in 40 ml. of tetrahydrofuran, and to the solution is added 10 ml. of a 20% solution of hydrogen chloride in 2-propanol. The resulting solution is treated with ether to turbidity, and the mixture obtained is cooled overnight to give a solid precipitate of 4-(m-aminophenyl)-1,6,7,8-tetrahydro - 1,3 - dimethylpyrazolo[3,4-e][1,4]diazepine, dihydrochloride, which is isolated and dried; m.p. 296° C. (with decomposition).

Example 18

To a stirred mixture consisting of 5.0 g. of 4-(m-aminophenyl)-1,6,7,8-tetrahydro - 1,3 - dimethylpyrazolo[3,4-e][1,4]diazepine, dihydrochloride, 2 ml. of concentrated hydrochloric acid, and 120 ml. of water at 0° C. is added dropwise a solution of 1.1 g. of sodium nitrite in 3 ml. of water. After the resulting mixture is stirred for 10 minutes at 0° C., a solution of 1.1 g. of sodium azide in 3 ml. of water is added in portions. The reaction mixture is then stirred for 90 minutes at 0° C., made alkaline with dilute aqueous sodium hydroxide, and the alkaline mixture is extracted with dichloromethane. The extract is evaporated to dryness to give a residue of 4-(m-azidophenyl)-1,6,7,8-tetrahydro - 1,3 - dimethylpyrazolo[3,4-e][1,4]diazepine; m.p. 129–131° C., following crystallization from acetone-ether.

Example 19

To a stirred mixture consisting of 5.0 g. of 4-(m-aminophenyl)-1,6,7,8-tetrahydro - 1,3 - dimethylpyrazolo[3,4-e][1,4]diazepine, dihydrochloride, 1.5 ml. of concentrated hydrochloric acid and 60 ml. of water, cooled to 0° C., is added dropwise a solution of 1.1 g. of sodium nitrite in 4 ml. of water. The resulting mixture is stirred at 10° C. for 10 minutes, and then there is added a solution prepared by adding 5 g. of potassium cyanide and 1 g. of sodium cyanide to a suspension of 4.5 g. of cuprous cyanide in 75 ml. of water containing 2.5 g. of potassium carbonate. The reaction mixture is stirred at room temperature for one hour and is then extracted with two 150-ml. portions of dichloromethane. Upon evaporation of the combined extracts, there is obtained a solid residue of 1,6,7,8-tetrahydro-4-(m-cyanophenyl) - 1,3 - dimethylpyrazolo[3,4-e][1,4]diazepine, which is isolated and dried; m.p. 183–185° C., following crystallization from acetone.

STARTING MATERIALS

The various starting materials employed in the foregoing examples and intermediates required for their preparation are obtained by the methods described in the following.

A. 4-Aroyl-5-chloropyrazoles: (1) 5 - Chloro-4-(m-chlorobenzoyl)-1,3-dimethylpyrazole. To a suspension of 76 g. of anhydrous aluminum chloride in 250 ml. of sym-tetrachloroethane is slowly added first 102 g. of m-chlorobenzoyl chloride, and then 74 g. of 5-chloro-1,3-dimethylpyrazole (for the preparation of this compound see *J. prakt. Chem.*, Vol. 110, page 153, 1925). The resulting mixture is stirred and heated under reflux for 18 hours, cooled, and poured into ice-water. The organic phase is separated, washed with dilute aqueous sodium hydroxide, and with water, dried, and evaporated to give a residue of 5-chloro-4-(m - chlorobenzoyl)-1,3-dimethylpyrazole; m.p. 81–83° C., following crystallization from carbon tetrachloride.

(2) 5-Chloro-4-(m - chlorobenzoyl)-1-ethyl-3-methylpyrazole; obtained by the method described in (1) above from the reaction of 82 g. of 5-chloro-1-ethyl-3-methylpyrazole with 102 g. of m-chlorobenzoyl chloride in the presence of 76 g. of anhydrous aluminum chloride in 250 ml. of sym-tetrachloroethane.

(3) 5 - Chloro-1,3-dimethyl-4-m-toluylpyrazole; b.p. 175–180° C./0.5 mm. Hg; m.p. 60° C.; obtained by the method described in (1) above from the reaction of 48 g. of 5-chloro-1,3-dimethylpyrazole with 57 g. of m-toluyl chloride in the presence of 49 g. of anhydrous aluminum chloride in 175 ml. of sym-tetrachloroethane.

(4) 4-(m-Bromobenzoyl)-5-chloro - 1,3 - dimethylpyrazole, m.p. 84–85° C., following crystallization from ethyl acetate-petroleum ether; obtained by the method described in (1) above from the reaction of 20 g. of 5-chloro-1,3-dimethylpyrazole with 33 g. of m-bromobenzoyl chloride in the presence of 20 g. of anhydrous aluminum chloride in 200 ml. of sym-tetrachloroethane.

(5) 4-(m-Bromobenzoyl)-5-chloro - 3 - ethyl-1-methylpyrazole; b.p. 160–170° C./0.3 mm. Hg; m.p. 50° C.; obtained by the method described in (1) above from the reaction of 21.5 g. of 5-chloro-3-ethyl-1-methylpyrazole with 33 g. of m-bromobenzoyl chloride in the presence of 20 g. of anhydrous aluminum chloride in 200 ml. of sym-tetrachloroethane.

(6) 5-Chloro-4-(m-fluorobenzoyl) - 1,3 - dimethylpyrazole; b.p. 150–155° C./0.2 mm. Hg; m.p. 44–46° C.; obtained by the method described in (1) above from the reaction of 33 g. of 5-chloro-1,3-dimethylpyrazole with 38 g. of m-fluorobenzoyl chloride in the presence of 33 g. of anhydrous aluminum chloride in 200 ml. of sym-tetrachloroethane.

(7) 5 - Chloro-3-ethyl-4-(m-fluorobenzoyl)-1-methylpyrazole, b.p. 159–165° C./0.3 mm. Hg; obtained by the method described in (1) above from the reaction of 46 g. of 5-chloro-3-ethyl-1-methylpyrazole with 52 g. of m-fluorobenzoyl chloride in the presence of 42 g. of anhydrous aluminum chloride in 200 ml. of sym-tetrachloroethane.

(8) 5-Chloro-3-ethyl - 1 - methyl-4-m-toluylpyrazole, b.p. 155–160° C./0.3 mm. Hg; obtained by the method of (1) above from the reaction of 15 g. of 5-chloro-3-ethyl-1-methylpyrazole with 16 g. of m-toluyl chloride in the presence of 14 g. of anhydrous aluminum chloride in 100 ml. of sym-tetrachloroethane.

(9) 5-Chloro-1,3-dimethyl - 4 - (m-trifluoromethylbenzoyl)-pyrazole. To a stirred solution of 39 g. of 4-bromo-5-chloro-1,3-dimethylpyrazole in 500 ml. of ether at 5° C. is added a solution of n-butyllithium (0.185 mole) in n-heptane, and the resulting mixture is stirred at 5–10° C. for 30 minutes. To the mixture is then added a solution of 31 g. of m-trifluoromethylbenzonitrile in 75 ml. of ether, and the reaction mixture is stirred and heated under reflux for 2 hours and at room temperature overnight. It is then treated with 500 ml. of water, and the organic phase is separated and evaporated under reduced pressure. To the residue is added 250 ml. of 3 N hydrochloric acid, and the mixture is stirred for one hour at room temperature and extracted with ether. The ether extract is dried and evaporated to give a residue of 5-chloro-1,3-dimethyl-4-(m-trifluoromethylbenzoyl)pyrazole; m.p. 68–69° C., following crystallization from ethyl acetate-petroleum ether.

(10) 5-Chloro-4-(m-hydroxybenzoyl)-1,3-dimethylpyrazole: To a stirred solution of 40 g. of 4-bromo-5-chloro-1,3-dimethylpyrazole in 400 ml. of anhydrous ether at 0° C. under nitrogen is added dropwise 140 ml. of a 1.44 M solution of n-butyllithium in n-heptane, and the resulting mixture is stirred at room temperature for 15 minutes. To the mixture is then added a solution of 27 g. of m-methoxybenzonitrile in 140 ml. of ether, and the reaction mixture is stirred and heated under reflux for 16 hours. Upon cooling, it is treated with 150 ml. of saturated aqueous ammonium chloride, and the organic phase is separated and extracted with 300 ml. of 3 N hydrochloric acid. The acidic extract is then heated at 95–100° C. for 30 minutes, cooled, and made basic with concentrated aqueous sodium hydroxide. The basic mixture is extracted with dichloromethane, and the dichloromethane extract is washed with water, dried, and evaporated to give a residue of 5-chloro-4-(m-methoxybenzoyl)-1,3-dimethylpyrazole; m.p. 89–91° C., following crystallization from ethyl acetate-petroleum ether.

A mixture consisting of 47 g. of 5-chloro-4-(m-methoxybenzoyl)-1,3-dimethylpyrazole, 125 ml. of glacial acetic acid, and 125 ml. of 48% hydrobromic acid is heated under reflux for 16 hours and then evaporated. The residue is extracted with 400 ml. of 2 N aqueous sodium hydroxide, and the extract is acidified with concentrated hydrochloric acid. The acidic mixture is in turn extracted with dichloromethane, and the dichloromethane extract is washed with water, dried, and evaporated under reduced pressure to give a residue of 5-chloro-4-(m-hydroxybenzoyl)-1,3-dimethylpyrazole; m.p. 168–170° C., following crystallization from 95% ethanol.

(11) 5-Chloro-4-(3,4-dichlorobenzoyl) - 1,3 - dimethyl-pyrazole; obtained by the method of (1) above from the reaction of 20 g. of 5-chloro-1,3-dimethylpyrazole with 31 g. of 3,4-dichlorobenzoyl chloride in the presence of 20 g. of anhydrous aluminum chloride in 200 ml. of sym-tetrachloroethane.

B. 5 - Chloro-4-(3-chloro-2-methylbenzimidoyl)-1,3-dimethyl-pyrazole. To a stirred solution of 24 g. of 4-bromo-5-chloro-1,3-dimethylpyrazole in 500 ml. of anhydrous ether cooled to −5° C. under nitrogen is added dropwise 80 ml. of a 1.44 M solution of n-butyllithium in n-heptane, and the resulting mixture is stirred at room temperature for 15 minutes. To the mixture is then added 17.5 g. of 3-chloro-2-methylbenzonitrile, and the reaction mixture is stirred and heated under reflux for 16 hours. Upon cooling, 200 ml. of saturated aqueous ammonium chloride is added, and the organic phase is separated and extracted with 200 ml. of cold 5 N hydrochloric acid. The acidic extract is immediately made basic with concentrated aqueous sodium hydroxide, and the basic mixture in turn is extracted with dichloromethane. The dichloromethane extract is washed with water, dried, and evaporated to give a residue of 5-chloro-4-(3-chloro-2-methylbenzimidoyl)-1,3-dimethylpyrazole, which is suitable for use without further purification.

C. 1,6,7,8-Tetrahydro-1,3-dimethyl - 4 - phenylpyrazolo-[3,4-e][1,4]diazepine. A mixture consisting of 11.7 g. of 4-benzoyl-5-chloro-1,3-dimethylpyrazole, 9 g. of ethylenediamine, and 125 ml. of 1-methyl-2-pyrrolidinone is stirred and heated under reflux for 16 hours and then evaporated under reduced pressure. The residue is stirred with dilute aqueous ammonia, and the basic mixture is extracted with dichloromethane. The dichloromethane extract is washed with water, dried, and evaporated to give a residue of 1,6,7,8-tetrahydro - 1,3 - dimethyl - 4 - phenylpyrazolo-[3,4-e][1,4]diazepine; m.p. 140–141° C., following crystallization from chloroform-isooctane.

D. 4-(m-Chlorophenyl) - 1,4,5,6,7,8 - hexahydro-1,3-dimethylpyrazolo[3,4-e][1,4]diazepine: A mixture of 40 g. of 5-chloro-4-(m-chlorobenzoyl)-1,3-dimethylpyrazole and 120 ml. of 30% aqueous ammonia is heated in a closed pressure vessel at 150–160° C. for 20 hours, then cooled and evaporated under reduced pressure. The residue is mixed well with a mixture of dichloromethane and dilute aqueous sodium hydroxide, and the organic phase is separated, washed with water, dried, and evaporated to give a residue of 5-amino-4-(m-chlorobenzoyl)-1,3-dimethylpyrazole; m.p. 107–109° C., following crystallization from ether.

A mixture consisting of 16 g. of 5-amino-4-(m-chlorobenzoyl)-1,3-dimethylpyrazole, 14.5 g. of bromoacetyl bromide, and 200 ml. of chloroform is heated under reflux for one hour. Upon cooling, the mixture is washed first with water and then with saturated aqueous sodium bicarbonate, dried, and evaporated under reduced pressure to give a residue of 5-(2-bromoacetamido)-4-(m-chlorobenzoyl-1,3-dimethylpyrazole; m.p. 155–157° C., following crystallization from ether.

A mixture consisting of 15 g. of the foregoing intermediate product, 3.0 g. of sodium azide, and 30 ml. of N,N dimethylformamide is stirred at room temperature for 2 hours, and is then diluted with 300 ml. of water. The aqueous mixture is extracted with ethyl acetate, and the ethyl acetate extract is washed with water, dried, and evaporated under reduced pressure to give a residue of 5-(2-azidoacetamido) - 4 - (m-chlorobenzoyl)-1,3-dimethylpyrazole; m.p. 138–140° C., following crystallization from ether.

To a solution of 10 g. of 5-(2-azidoacetamido)-4-(m-chlorobenzoyl)-1,3-dimethylpyrazole in 90 ml. of acetic acid is added 500 mg. of 5% palladium-on-carbon, and the resulting mixture is shaken with hydrogen at 50 lbs./in.² for 4 hours at room temperature. The catalyst is removed by filtration, and the filtrate is evaporated under reduced pressure to give a residue of 4-(m-chlorophenyl) - 6,8 - dihydro - 1,3 - dimethylpyrazolo[3,4-e]-[1,4]diazepin-7(1H)-one; m.p. 255–256° C., following crystallization from acetone.

To a solution of aluminum hydride, prepared by adding a solution of 2.7 g. of aluminum chloride in 60 ml. of ether to a suspension of 2.4 g. of lithium aluminum hydride in 150 ml. of tetrahydrofuran and 60 ml. of ether, is added 5.8 g. of 4-(m-chlorophenyl-6,8-dihydro-1,3-dimethylpyrazolo[3,4 - e][1,4]diazepin-7(1H)-one, and the mixture is stirred and heated under reflux for 2 hours. Upon cooling, the mixture is treated successively with 6 ml. of water, 6 ml. of 20% aqueous sodium hydroxide, and 10 ml. of water. The resulting aqueous mixture is then filtered, and the filtrate is evaporated under reduced pressure to give a residue of 4-(m-chlorophenyl)-1,4,5,6,7,8 - hexahydro 1,3 - dimethylpyrazolo[3,4-e][1,4]diazepine. The dihydrochloride salt, m.p. 255° C. (with decomposition), is prepared by mixing a solution of the free base in tetrahydrofuran with a slight excess of a 20% solution of hydrogen chloride in 2-propanol and diluting the mixture with ether.

E. 4 - (m - Chlorophenyl) - 8 - ethyl - 1,4,5,6,7,8-hexahydro - 1,3 - dimethylpyrazolo[3,4-e][1,4]diazepine: A mixture consisting of 11 g. of 4-(m-chlorophenyl)-1,6,7,8 - tetrahydro - 1,3 - dimethylpyrazolo[3,4-e][1,4] diazepine, 12 ml. of acetic anhydride, and 100 ml. of dichloromethane is kept at room temperature for 16 hours, and then evaporated under reduced pressure to give a residue of 8 - acetyl - 4 - (m-chlorophenyl) - 1,6,7,8-tetrahydro - 1,3 - dimethylpyrazolo[3,4-e][1,4]diazepine; the monohydrochloride salt, obtained by treating a solution of the free base in acetone with a slight excess of a 20% solution of hydrogen chloride in 2-propanol, has m.p. 266–267° C.

A solution of 11 g. of the foregoing intermediate product in 40 ml. of tetrahydrofuran is added to a solution of aluminum hydride, prepared by adding a solution of 3.9 g. of aluminum chloride in 80 ml. of ether to a suspension of 3.6 g. of lithium aluminum hydride in 150 ml. of tetrahydrofuran and 75 ml. of ether, and the resulting mixture is stirred at room temperature for 90 minutes and heated under reflux for 2 hours. Upon cooling, there are added successively 9 ml. of water, 9 ml. of 20% aqueous sodium hydroxide, and 14 ml. of water. The aqueous mixture is filtered, and the filtrate is evaporated under reduced pressure to give a residue of 4-(m-chlorophenyl)-8 - ethyl - 1,4,5,6,7,8 - hexahydro - 1,3-dimethylpyrazolo-[3,4-e][1,4]diazepine. The dihydrochloride salt, m.p. 190° C. (with decomposition), is prepared by treating a solution of the free base in 2-propanol with a slight excess of a 20% solution of hydrogen chloride in 2-propanol and diluting the resulting solution with ethyl acetate.

We claim:

1. A member of the class consisting of pyrazolodiazepine compounds having the formula

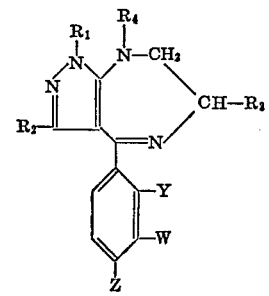

and pharmaceutically-acceptable acid-addition salts thereof; where each of $R_1$ and $R_2$ is methyl or ethyl, $R_3$ is hydrogen or methyl, $R_4$ is hydrogen, methyl, or ethyl, W represents a member of the class consisting of chloro, bromo, fluoro, methyl, nitro, hydroxy, trifluoromethyl, amino, cyano, and azido, and one of Y and Z represents hydrogen, chloro, or methyl and the other of Y and Z represents hydrogen.

2. A compound according to claim 1 which is 4-(m-chlorophenyl) - 1,6,7,8 - tetrahydro - 1,3 - dimethylpyrazolo[3,4-e][1,4]diazepine.

3. A compound according to claim 1 which is 4-(m-bromophenyl) - 1,6,7,8 - tetrahydro - 1,3 - dimethylpyrazolo[3,4-e][1,4]diazepine.

4. A compound according to claim 1 whch is 4-(m-chlorophenyl) - 1,6,7,8 - tetrahydro - 1,3,8, - trimethyl-pyrazolo[3,4-e][1,4]diazepine.

5. A compound according to claim 1 which is 4-(m-chlorophenyl) - 1,6,7,8 - tetrahydro - 1,3 - trimethyl-pyrazolo[3,4-e][1,4]diazepine, dihydrochloride.

6. A compound acocrding to to claim 1 which is 4-(m-chlorophenyl)) - 1,6,7,8 - tetrahydro - 1,3,6 - trimethyl-pyrazolo[3,4-e][1,4]diazepine.

7. A compound according to claim 1 which is 4 - (3-chloro - o - tolyl) - 1,6,7,8 - tetrahydro - 1,3 - dimethyl-pyrazolo[3,4-][1,4]diazepine.

8. A compound according to claim 1 which is 4-(m-chlorophenyl) - 8 - ethyl - 1,6,7,8 - tetrahydro - 1,3-dimethylpyrazolo[3,4-e][1,4]diazepine.

9. A compound according to claim 1 which is 4-(m-chlorophenyl) - 8 - ethyl - 1,6,7,8 - tetrahydro - 1,3-dimethylpyrazolo[3,4-e][1,4]diazepine, dihydrochloride.

References Cited

UNITED STATES PATENTS

| | | | |
|---|---|---|---|
| 3,222,359 | 12/1965 | Reeder et al. | 260—239 BD |
| 3,555,010 | 1/1971 | Ross | 260—239 BD |
| 3,579,580 | 5/1971 | Archer et al. | 260—239 BD |
| 3,657,271 | 4/1972 | Swett | 260—310 R |
| 3,660,425 | 5/1972 | De Wald et al. | 260—310 R |

OTHER REFERENCES

De Wald et al.: Chem. Abst. vol. 74, No. 100119S (1971).

NATALIE TROUSOF, Primary Examiner

U.S. Cl. X.R.

260—311; 424—273